July 19, 1960 E. V. SCHNEIDER 2,946,054

REMOTE CONTROL RADIO SYSTEM

Filed April 16, 1956

INVENTOR.
EMMOR V. SCHNEIDER
BY Woodling and Krost,
Attys.

United States Patent Office 2,946,054

Patented July 19, 1960

2,946,054

REMOTE CONTROL RADIO SYSTEM

Emmor V. Schneider, Alliance, Ohio, assignor to The Alliance Manufacturing Company, division of Consolidated Electronics Industries Corporation, Wilmington, Del.

Filed Apr. 16, 1956, Ser. No. 578,261

3 Claims. (Cl. 343—225)

The invention relates in general to radio systems and more particularly to a remote control radio system for remote control of an electrical load which utilizes a novel and simple transmitter radiating energy to a novel and simple radio receiver.

An object of the invention is to provide a remote control radiant energy system which is simple and economical to construct and operate.

Another object of the invention is to provide a very low frequency radiant energy system of a radio transmitter and receiver.

Still another object of the invention is to provide a radio system with a minimum of parts.

Still another object of the invention is to provide a radiant energy transmitter which does not utilize any vacuum tubes, gas-filled tubes, or other amplifying devices.

Still another object of the invention is to provide a receiver for use in a remote control system which will operate a relay whereby the relay may operate any suitable electrical load upon the actuation of a transmitter designed for use with the remote control receiver.

Still another object of the invention is to provide a receiver in a radio system which is operable on a low frequency carrier interrupted at a lower interruption frequency which yet is higher than the usually available power frequencies.

Still another object of the invention is to provide a radio system of a transmitter and receiver both operating at a low frequency carrier interrupted at an interrupting frequency wherein both the carrier frequencies and the interrupting frequencies of the transmitter and received circuits must be substantially identical in order to operate a relay in the load of the receiver thus providing a coded system preventing unauthorized actuation of the relay.

Other objects and a fuller understanding of this invention may be had by referring to the following description and claims, taken in conjunction with the accompanying drawing, in which:

Figure 1:
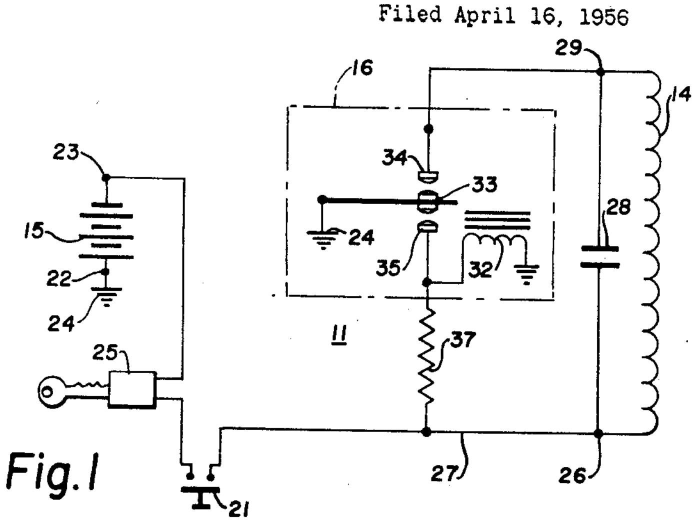
Figure 1 is a schematic diagram of a radio transmitter of the invention.
Figure 3:
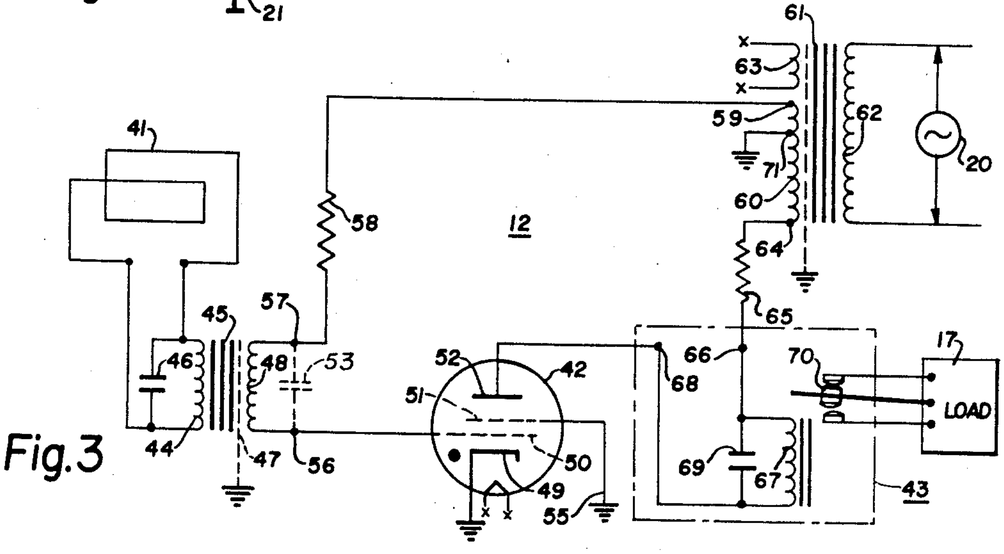
Figure 3 is a schematic diagram of a radio receiver usable with the transmitter of Figures 1 and 2.

Figure 1 shows a radio transmitter circuit 11 usable with a radio receiver circuit 12 shown in Figure 3, the two comprising a complete radio system. The radio transmitter circuit 11 includes generally a radiating coil 14 energized periodically from a voltage source 15 through an interrupting device 16. The transmitter circuit 11 may be used for remotely controlling any electrical load, such as the load 17 shown in Figure 3. One such use is to have the transmitter circuit mobile, such as in an automotive vehicle, with the receiver circuit 12 stationary and operated from a power frequency voltage source 20 so that depressing the push button switch 21 in the transmitter causes actuation of the electrical load 17.

This actuation is accomplished by radiating radiant energy from the radiating coil 14 to the radio receiver circuit 12. The transmitter circuit is operable from the voltage source 15 which in this case is shown as a direct current battery source with first and second terminals 22 and 23. The first terminal 22 is connected to ground 24 and the second terminal 23 is connected to a key operated switch 25, such as the ignition switch of an automotive vehicle. The push button switch 21 is connected between the key operated switch 25 and one terminal 26 of the radiating coil 14 by a conductor 27. A capacitor 28 is connected between the terminal 26 and a second terminal 29 of the coil 14.

The interrupting device 16 may be the conventionally used vibrator having a driving means such as the driver coil 32 driving a movable contact 33 which electrically contacts first and second stationary contacts 34 and 35. The driver coil 32 has one end connected to ground and the other end connected to the stationary contact 35. A current limiting resistor 37 interconnects the stationary contact 35 and the conductor 27. The movable contact 33 is also connected to ground 24.

The radiating coil 14 may be many turns of large diameter of fairly heavy wire in order to have a relatively low impedance; and the capacitor 28 may be chosen to resonate with the inductance of the coil 14 at a low carrier frequency or signal frequency which may be within the audio frequency range, for example 5,000 cycles per second. The vibrator 16 may be any of the usual types but preferably is other than a 60 cycle vibrator, and one of 115 cycles per second has been found quite satisfactory.

*Operation*

In operation the transmitter circuit may be operated whenever the ignition switch 25 is electrically closed. When the push button switch 21 is pressed, voltage will flow from the battery 15 through the resistor 37 to the driver coil 32. The vibrator movable contact 33 then is pulled to one side to contact the stationary contact 35. This shunts the driver coil 32 so that the movable contact 33 swings back to make contact with the stationary contact 34. Simultaneously the driver coil is again energized by a releasing of the shunt and thus the driver coil 32 provides alternate make and break with the stationary contacts 34 and 35 at an interrupting or periodic frequency which, in the example given, is 115 cycles per second.

Figure 4:
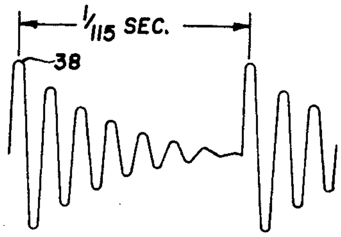
Figure 4 is a graph of the wave form of the radiated energy.

As the movable contact 33 contacts the stationary contact 34, battery current flows through the radiating coil 14. As the movable contact 33 breaks contact with the stationary contact 34, the energizing circuit from the battery through the coil 14 is broken. This causes a collapse of flux in the radiating coil 14 which drives current through the capacitor 28 in order to maintain inductive current flow in the coil 14. This current flow through the radiating coil will be at the resonant frequency of the signal or carrier which, in this example, has been taken to be 5,000 cycles per second. Therefore, the radiated energy from the coil 14 will be essentially that shown in Figure 4. It has been found that several hundred volts can be developed across the coil 14 at the point 38, which is the instant when the movable contact 33 breaks from the stationary contact 34. The radiated energy is thus an oscillatory train periodically repeated at the interrupting frequency, with this oscillatory train practically dying out between pulses of the interruption frequency caused by the vibrator 16. The degree of decay is, of course, dependent upon circuit constants; but in any event the coil radiates energy at the frequency of the tank circuit 14—28 with this carrier frequency interrupted at the frequency of the breaking of the circuit caused by the movable contact 33.

Figure 2:
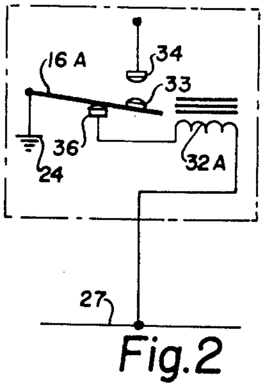
Figure 2 is a partial schematic diagram of an alternative vibrator arrangement for the transmitter of Figure 1.

The Figure 2 shows an alternative circuit arrangement of a different form of vibrator 16A which may be used in place of the vibrator 16 in Figure 1. In Figure 2 the vibrator 16A has a driver coil 32A which is called a series driven coil rather than a shunt driven coil. This is another usual form of vibrator driving circuit; and when conductor 27 is energized, current flows through the driver coil 32A to ground. This moves the movable contact 33 toward the stationary contact 34, but this action interrupts the series circuit through the driver coil 32A and thus the movable contact 33 will return toward the stationary contact 36 to set up vibratory movement in the movable contact 33.

The Figure 3 shows schematically a radio receiver which is utilizable in a complete radio system with the transmitter 11 of Figure 1. Radiant energy is received on an antenna 41 and amplified by an amplifier 42 to control the load 17 by means of a relay 43. The antenna has been shown as a loop antenna which preferably is a large number of turns of relatively large diameter, such as one to two feet. The loop antenna may be untuned but preferably is matched in impedance to the impedance of a primary 44 of a step-up input transformer 45. A capacitor 46 may be connected across the primary 44 with this capacitor being an RF by-pass capacitor to by-pass any stray radio frequencies received on the antenna 41. The transformer 45 is preferably provided with electrostatic shielding 47 to electrostatically shield the secondary 48 from any stray radio frequencies. The transformer 45 is preferably a step-up transformer which may be in the ratio of one to two hundred (1:200), and therefore, the secondary 48 will have a high number of turns of fine wire for a high secondary impedance. The high number of turns on the secondary 48 introduces enough stray capacity 53 turn-to-turn so that the secondary is made parallel resonant to the incoming carrier frequeuncy which in this example is about 5,000 cycles per second.

The amplifier 42 is a form of a unidirectional current conducting device, and in this preferred embodiment is shown as a gas-filled thyratron. This thyratron 42 has a cathode 49, control grid 50, screen grid 51, and plate 52. A suitable thyratron may be a hot cathode type 5696. The screen grid 51 and cathode 49 are connected to ground 55. The control grid 50 is connected to one terminal 56 of the input transformer secondary 48. The other terminal 57 of the secondary 48 is connected through a grid current limiting resistor 58 to a first end connection 59 of a secondary 60 of an energizing transformer 61. The transformer 61 has a primary 62 energized from the power frequency alternating current source 20 and also may have an additional secondary winding 63 for energizing the filament of the thyratron 42. The secondary 60 has an intermediate connection 71 connected to ground 55. A second end connection 64 of the secondary 60 is connected through a plate current limiting resistor 65 to a terminal 66 of a relay coil 67 of the relay 43. The other terminal 68 of the relay coil 67 is connected to the plate 52. A filter capacitor 69 is connected across the terminals of the relay coil 67. The relay 43 has contact means illustrated by the single pole, double throw contacts 70 which are connected to, and therefore may control, the electrical load 17.

*Operation of receiver*

The receiver circuit 12 is a simply and economically designed circuit to operate on an incoming carrier or signal frequency; and when such carrier is of sufficient value, the relay 43 will be energized to actuate the contacts 70 and thus control electrical load 17. The receiver 12 is particularly designed to be operable with the transmitter circuit 11; and for purposes of explanation, the carrier frequency may be a very low frequency such as in the audio range in the order of 5,000 cycles per second. It naturally would be chosen to be on the same operating frequency as the transmitter 11. The receiver circuit 12 is operable from an alternating current source and thus operates on only half wave pulses, that is, when terminal 64 is positive relative to terminal 59. At this time the plate 52 will be positive relative to the grounded cathode 49. This voltage on the plate may be in the order of 100 volts. The intermediate connection 71 is so chosen relative to terminal 59 as to place a negative bias on the grid 59 relative to cathode 49 to bias the thyratron 42 substantially to a non-conducting condition. This is when no signal is received. Such bias may be in the order of five volts negative at terminal 59 relative to ground. This entire negative bias, it has been found, does not appear at the grid 50. About three and one-half volts may be all that appears at the grid 50 with the loss due perhaps to the capacity to ground at the secondary 48 and also because the inductance of the input transformer 45 causes the grid voltage to be slightly out of phase with the anode voltage. For this latter reason the grid current limiting resistor 58 is made relatively high in value to prevent spurious firing of the thyratron 42 when no signal is received on the antenna 41. Therefore, this resistor 58 is used as much as a device to limit the voltage on the grid as it is to limit the current. The particular thyratron 42 used in the circuit requires anywhere from minus .2 to minus 2 volts on the grid for cut-off, with 100 volts on the anode with the variation being due to production variation and aging of the tubes. Therefore, this cut-off condition is provided by the approximately five volts between terminals 59 and 71.

The amplifier 42 tends to pass a very small amount of current even when no signal is present; and therefore, the plate current limiting resistor 69 has been used in the output circuit to limit the current and to prevent energization of the relay 43 to the pull-in point. Also, the resistor 65 limits the plate current to prevent damage to the tube during the instantaneous heavy charging current for the filter capacitor 69. This filter capacitor should be of relatively large value in the order of ten to twenty microfarads in order to maintain closed the relay contact 70 on the half pulses of power frequency energy such as 60 cycle current passing through the relay 43. This, of course, would be when signal is present on the antenna 41.

Upon receiving a carrier frequency signal to which the input transformer 45 is tuned, this frequency is passed by this transformer to the grid and cathode of the thyratron 42. When this incoming carrier is of sufficient value, it will overcome the negative bias on the grid to cause the thyratron to conduct. This conduction will be at the 60 cycle rate, and these half wave pulses of energy energize the relay 43 with capacitor 69 maintaining the relay energized and thus preventing chatter of the contacts 70. In the circuit as used, the relay contacts close with about three or four milliamperes of plate current, and sufficient radiant energy even at these low frequencies may be transmitted between the transmitter radiating coil 14 and the receiving antenna 41 to cause pull-in of the relay 43.

The interrupting frequency in the transmitter 11 has been stated to be about 115 cycles per second. The fact that this interrupting frequency is higher than the power frequency is an advantage in that the pulse trains of carrier frequency will occur on the average more than once per 60 cycle per second application of positive voltage to the plate 52. This makes certain that, when a signal is being received, there will always be an incoming signal voltage applied to the grid 50 to maintain the tube 42 conducting during each positive half cycle on the plate 52.

Figure 5:
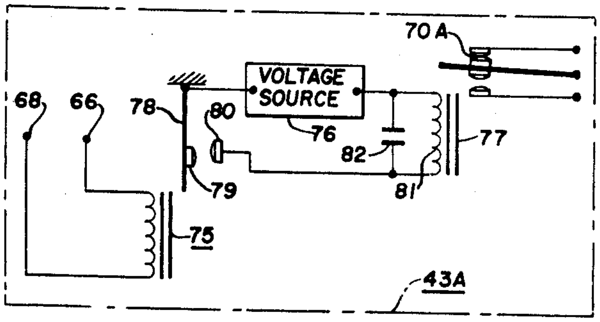
Figure 5 is a modification of a part of the receiver circuit of Figure 3.

The Figure 5 shows a modification of part of the receiver circuit and shows a different form of relay means 43A. The relay means 43A may be substituted for the relay 43 by the connections at the terminals 66 and 68. The relay means 43A includes a tuned relay 75, a voltage source 76, and a second relay 77. The tuned relay 75 has a tuned reed 78 carrying a movable contact 79 for co-operation with a stationary contact 80. These two contacts 79 and 80 are connected in series circuit arrangement with the voltage source 76 and actuating coil 81 of the second relay 77. A filter capacitor 82 is connected across the coil 81. The second relay 77 controls contacts 70A which may be similar in function to the contacts 70 of relay 43.

In operation the tuned reed 78 of the tuned relay 75 would be tuned to the interruption frequency of the incoming carrier. In the example given this is 115 cycles per second; and therefore, when the interrupted carrier of the right interruption and carrier frequencies is received, it is passed by the thyratron 42 to energize the tuned relay 75 sufficiently to cause contacts 79 and 80 to be intermittently engaged. The voltage source 76 then causes energization of the relay coil 81 with filter capacitor 82 maintaining energized this second relay 77. This modification of Figure 5 therefore provides an additional system for coding the receiver 12 with the transmitter 11 in any complete radio system involving the two. This coding will prevent unauthorized actuation of the relay means 43A. Because several different carrier frequencies may be chosen and because several different interrupting frequencies may be chosen, the product of the number of different interrupting and carrier frequencies will be the total number of combinations of compatible receivers and transmitters in this complete radio system. One possible use of this entire radio system is wherein an operator in the automotive vehicle in which the transmitter 11 is contained may actuate an electrical load 17 by pressing the push button switch 21 whenever the transmitter 11 is within range of the receiver 12. This electrical load may be in the switching on of garage and yard lights or may be for a garage door operator or other suitable use. By the use of the tuned relay 75 the number of possible combinations to thwart unauthorized users may be greatly increased.

It will therefore be seen that the present invention provides a combined transmitter and receiver and a complete radio system which is simple and economical to construct and operate, which has few parts, which has no vacuum tube or other amplifier within the transmitter, and which is operable on very low frequencies.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. A remote control radio receiver for use with a carrier frequency in the order of five thousand cycles per second interrupted at a lower frequency in the order of one hundred fifteen cycles per second, comprising, a loop antenna with two connections, an iron core step-up input transformer having a secondary winding and having a primary winding connected to said two antenna connections, an RF by-pass capacitor connected in parallel with said primary, shielding in said transformer between said windings connected to ground, a thyratron having cathode, grid, and plate, means for connecting said cathode to ground, an energizing transformer having primary and secondary windings, means for connecting said energizing transformer primary winding to an alternating current source of a frequency lower than said interrupting frequency, first and second end connections and an intermediate connection on said energizing transformer secondary, means for connecting said intermediate connection to ground, a grid current limiting resistor for connecting said first end connection to one end of said input transformer secondary, means for connecting the other end of said input transformer secondary to said grid, a tuned first relay having contacts and an energizing coil and tuned to said interrupting frequency, a plate current limiting resistor connecting one end of said relay coil to said second end connection of said energizing transformer secondary, means for connecting said plate to the other end of said relay coil, whereby, when a sufficient value of said carrier frequency interrupted at said interrupting frequency is received on said antenna, it is passed by said step-up input transformer to bias said grid positive during at least part of the period when said plate is positive relative to said cathode to fire said thyratron periodically at said energizing source frequency to periodically close said relay contacts at said interrupting frequency, a voltage source, and a second relay controlled in energization from said voltage source through said first relay contacts.

2. A remote control radio receiver for use with a carrier frequency in the order of five thousand cycles per second interrupted at a lower frequency in the order of one hundred fifteen cycles per second, comprising, a loop antenna with two connections, an iron core step-up input transformer having a secondary winding and having a primary winding connected to said two antenna connections, an RF by-pass capacitor connected in parellel with said primary, shielding in said transformer between said windings connected to ground, means for effectively tuning said secondary to resonance at said carrier frequency, a hot cathode thyratron having cathode, grid, and plate, means for connecting said cathode to ground, an energizing transformer having primary and secondary windings, means for connecting said energizing transformer primary winding to an alternating current source, first and second end connections and an intermediate connection on said energizing transformer secondary, means for connecting said intermediate connection to ground, a grid current limiting resistor for connecting said first end connection to one end of said input transformer secondary, means for connecting the other end of said input transformer secondary to said grid, a relay having contacts and an energizing coil, a plate current limiting resistor connecting one end of said relay coil to said second end connection of said energizing transformer secondary, means for connecting said plate to the other end of said relay coil, and a second capacitor connected across said relay coil to prevent chatter of said contacts whereby, when a sufficient value of an audio frequency carrier interrupted at a lower frequency which is higher than the frequency of said energizing source is received on said antenna, it is passed by said step-up input transformer to bias said grid in a positive direction during at least part of the period when said plate is positive relative to said cathode to fire said thyratron periodically at said energizing source frequency with said second capacitor smoothing the pulses of plate current to maintain closed said relay contacts.

3. A radio system for remote control of an electrical load, comprising a mobile transmitter and a receiver, said transmitter being operable from a direct current battery source having first and second terminals and including, a vibrator having first and second stationary contacts and movable contact cooperable therewith, means for connecting to ground said movable contact and said first terminal, a driver coil for driving said movable contact at an interrupting frequency in the order of one hundred fifteen cycles per second and connected between said second stationary contact and ground, a radiating coil, a capacitor connected in parallel with said coil to tune same to resonance at a carrier frequency in the order of five thousand cycles, a current limiting resistor connected to said second stationary contact, a control push button connected between said second source terminal and said current limiting resistor to energize said driver coil, and means including said current limiting resistor for connecting said radiating coil to the two stationary contacts of said vibrator, whereby, as the movable contact is driven by the driver coil to alternately contact the first and second stationary contacts, current is passed through said coil from said source when the first contact is electrically contacted and then as the movable contact breaks contact with the first stationary contact, the collapse of flux in the coil causes current flow through said capacitor, whereby the coil radiates decaying oscillatory trains of energy at the carrier frequency interrupted at the interruption frequency with the oscillatory trains of the carrier frequency practically dying out between pulses of the interruption frequency, said receiver including, a loop antenna with two connections, an iron core step-up input transformer having a secondary winding and having a primary winding connected to said two antenna connections, an RF by-pass capacitor connected in parallel with said primary, shielding in said transformer between said windings connected to ground, means for effectively tuning said secondary to resonance at said carrier frequency, a hot cathode thyratron having cathode, grid, and plate, means for connecting said cathode to ground, an energizing transformer having primary and secondary windings, means for connecting said energizing transformer primary winding to an alternating current source, first and second end connections and an intermediate connection on said energizing transformer secondary, means for connecting said intermediate connection to ground, a grid current limiting resistor for connecting said first end connection to one end of said input transformer secondary, means for connecting the other end of said input transformer secondary to said grid, a relay having contacts and an energizing coil, a plate current limiting resistor connecting one end of said relay coil to said second end connection of said energizing transformer secondary, means for connecting said plate to the other end of said relay coil, and a third capacitor connected across said relay coil to prevent chatter of said contacts whereby, when a sufficient value of said interrupted carrier is received on said antenna, it is passed by said step-up input transformer to bias said grid in a positive direction during at least part of the period when said plate is positive relative to said cathode to fire said thyratron periodically at said energizing source frequency with said third capacitor smoothing the pulses of plate current to maintain closed said relay contacts, and means for controlling said electrical load by said relay contacts.

References Cited in the file of this patent

UNITED STATES PATENTS

| | | |
|---|---|---|
| Re. 23,820 | Bagno | May 4, 1954 |
| 1,323,472 | Herdman | Dec. 2, 1919 |
| 1,709,377 | Sperry | Apr. 16, 1929 |
| 2,558,434 | Hofberg | June 26, 1951 |
| 2,588,879 | Richards | Mar. 11, 1952 |
| 2,634,385 | Martin | Apr. 7, 1953 |
| 2,695,951 | Hupert et al. | Nov. 30, 1954 |
| 2,695,977 | Hupert et al. | Nov. 30, 1954 |
| 2,699,499 | Jordan | Jan. 11, 1955 |
| 2,715,721 | Behn | Aug. 16, 1955 |

FOREIGN PATENTS

| | | |
|---|---|---|
| 137,564 | Great Britain | Jan. 22, 1920 |